(12) United States Patent
Buettiker

(10) Patent No.: US 6,199,405 B1
(45) Date of Patent: Mar. 13, 2001

(54) GLASS FEEDER

(75) Inventor: Paul Buettiker, Bloomfield, CT (US)

(73) Assignee: Emhart Glass S.A., Cham (CH)

( * ) Notice: Subject to any disclaimer, the term of this patent is extended or adjusted under 35 U.S.C. 154(b) by 1159 days.

(21) Appl. No.: 08/675,465

(22) Filed: Jun. 28, 1996

Related U.S. Application Data

(63) Continuation of application No. 08/210,134, filed on Mar. 16, 1994, now abandoned.

(51) Int. Cl.[7] .................................................. C03B 7/088
(52) U.S. Cl. ............................... 65/325; 65/126; 65/333
(58) Field of Search .............................. 65/325, 328, 330, 65/331, 333, 129, 126

(56) References Cited

U.S. PATENT DOCUMENTS

| | | | | |
|---|---|---|---|---|
| 2,075,756 | * | 3/1937 | Barker, Jr. ............................... | 65/325 |
| 2,485,808 | * | 10/1949 | Berthold ................................. | 65/129 |
| 2,654,185 | * | 10/1953 | Honiss .................................... | 65/325 |
| 3,393,989 | * | 7/1968 | Strausbaugh ............................ | 65/325 |
| 4,305,747 | * | 12/1981 | Kirkman et al. ....................... | 65/330 |
| 4,554,000 | * | 11/1985 | Suomala et al. ....................... | 65/330 |
| 4,581,054 | * | 4/1986 | Mumford ................................. | 65/325 |
| 4,999,040 | * | 3/1991 | Stankosky .............................. | 65/325 |

FOREIGN PATENT DOCUMENTS 2079266   7/1980   (GB) .

* cited by examiner

Primary Examiner—Sean Vincent
(74) Attorney, Agent, or Firm—Spencer T. Smith

(57) ABSTRACT

A glass feeder which discharges parallel runners of molten glass which can be sheared into discrete gobs for processing in a glass container forming machine. The spout bowl has a neck portion at the bottom which includes a discharge passage. This passage is circular at the top where it communicates with the bottom surface of the spout bowl and oblong at the bottom where it communicates with a corresponding oblong opening in a bathtub shaped orifice ring. The orifice ring has a closed oblong shaped bottom smaller than the oblong opening and has a plurality of discharge holes defined along a straight line.

2 Claims, 2 Drawing Sheets

GLASS FEEDER

This application is a continuation of continuation application Ser. No. 08/210,134, filed Mar. 16, 1994 now abandoned.

The present invention relates to feeders for delivering vertical runners of molten glass to a shear mechanism which severs the runners into discrete gobs for distribution to a glass container forming machine such as an I.S. machine or an H-28 machine.

State of the art glass feeders are shown in U.S. Pat. Nos. 4,554,000 and 4,999,040. Such feeders have a spout bowl which has a cylindrical vertical outlet at the bottom. This cylindrical outlet is closed by a circular orifice plate which has one, two, three or four in-line holes through which the glass passes. Needles, corresponding in number and location to the holes in the orifice plate, are located within the cylindrical outlet and reciprocate vertically to form the runners as they are sheared into the gobs.

Heat loss while the molten glass passes through the cylindrical opening and as it sets on the orifice plate creates an uneven temperature distribution across the glass and this is undesirable.

It is an object of the present invention to provide a glass feeder which achieves a more uniform temperature across the molten glass.

Other objects and advantages of the present invention will become apparent from the following portion of this specification and from the accompanying drawings which illustrate in accordance with the mandate of the patent statutes a presently preferred embodiment incorporating the principles of the invention.

Referring to the drawings.

Figure 1:
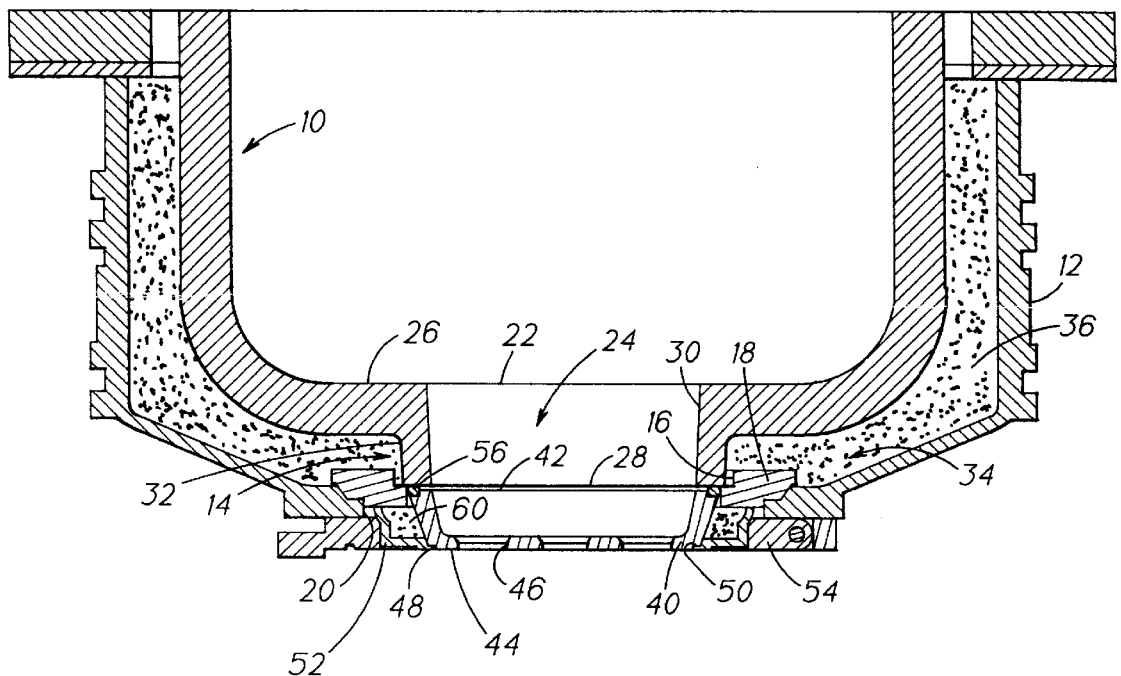
FIG. 1 is an elevational, cross sectional view of a glass feeder taken from side to side.
Figure 2:
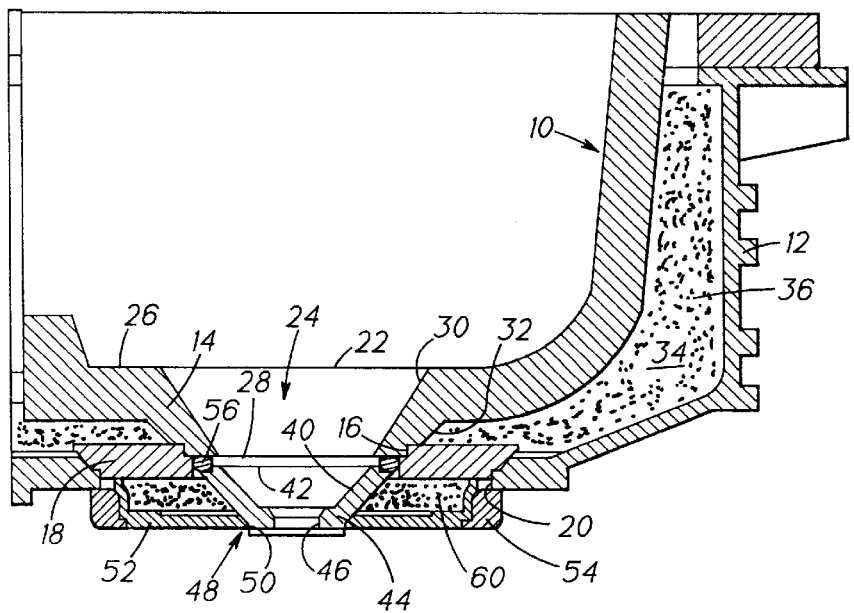
FIG. 2 is an elevational, cross sectional view of the glass feeder at 90° from the view shown in FIG. 1.
Figure 3:
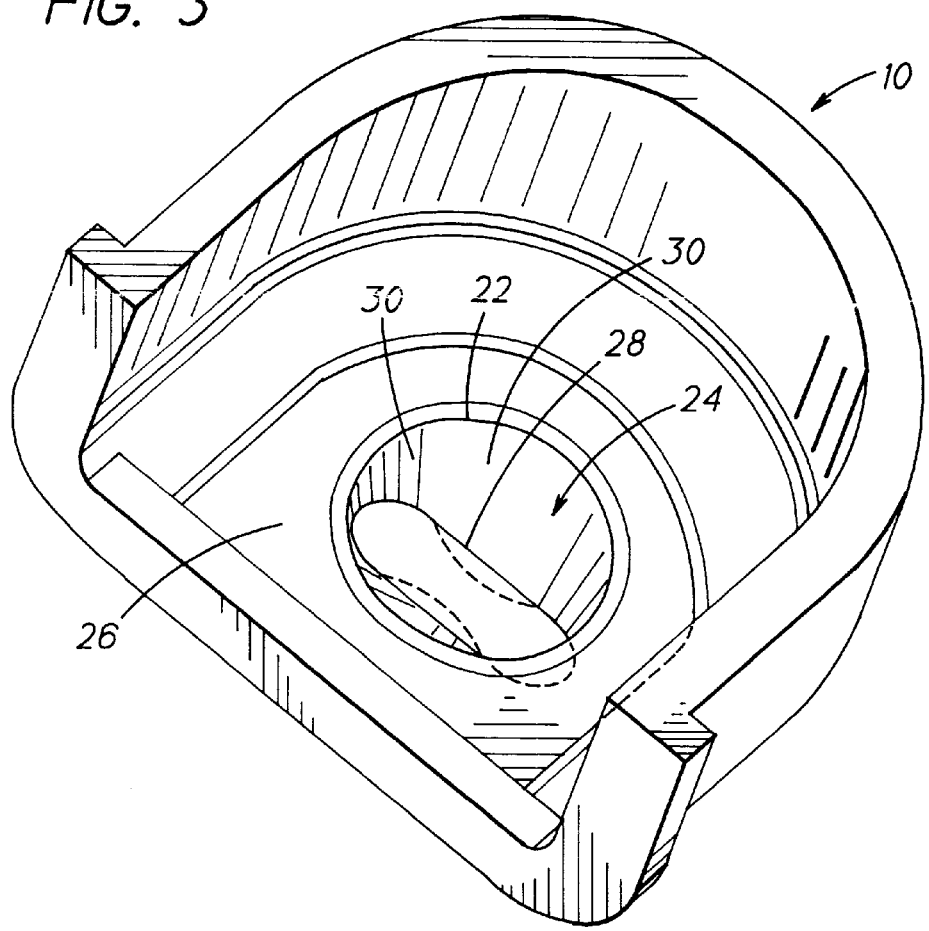
FIG. 3 is an oblique view looking downwardly into the spout bowl of the glass feeder.
Figure 4:
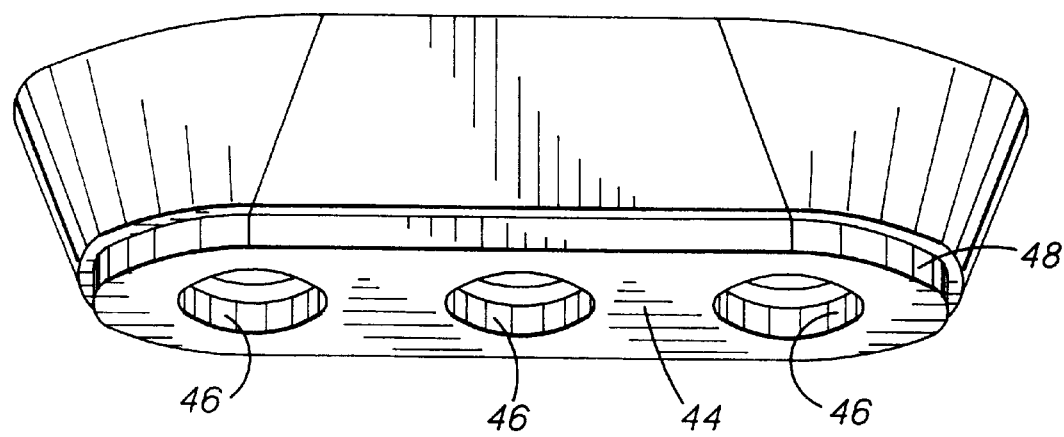
FIG. 4 is an oblique view looking upwardly at the orifice plate.

Referring to FIGS. 1 and 2, a refractory spout bowl 10 made from refractory material is located within a spout bowl housing 12 with the vertically downwardly projecting neck portion 14 of the spout bowl 10 supported on an annular groove 16 of a support ring 18. This ring nests on the circular bottom opening 20 of the housing. As can be seen from FIG. 3, the inlet opening 22 of neck passage hole 24 which intersects the inside bottom surface 26 of the spout bowl is circular while the exit opening 28 at the bottom of the neck is oblong (elliptical in the illustrated embodiment). The inner surface 30 of the neck discharge passage smoothly transitions from the circular inlet to the oblong outlet. As can be seen from the drawings the circular upper inlet opening has a size which is slightly larger then the major dimension of the oblong exit opening, i.e., the lower oblong outlet opening which is defined by major and minor dimensions, is located completely within the upper circular inlet opening. This is shown in FIG. 1, where there is a slight taper inwardly from the top to the bottom of the spout bowl hole at the major dimension of the oblong opening. The exterior neck surface 32 smoothly follows the interior surface 30 to the oblong bottom. This creates a much larger space 34 between the neck 14 and the spout bowl housing 12 in which insulation 36 can be located to reduce heat loss from the molten glass.

The orifice ring 40, which is also made from refractory material, has an oblong (elliptical in the illustrated embodiment) inlet opening 42 matching the oblong outlet 28 of the spout bowl neck and a smaller oblong (elliptical in the preferred embodiment or bowed in slightly as shown in dotted lines) bottom 44 in which a number (3) of vertical discharge holes 46 are defined. The bottom of this orifice ring has an annular groove 48 which is received by a suitable opening 50 in the metallic orifice pan 52 which is held in its desired position by a clamp 54. When so clamped, an annular seal 56 located between the bottom of the neck and the top of the orifice ring seals the flow path. The now empty area 60 within the pan 52 can be filled with insulation 36 to reduce heat loss from the orifice ring.

This novel design 1. redistributes the glass flow in the spout neck in such a way as to equalize the flow rates in double, triple, . . . (multiple gob) spout configurations;
2. reduces or eliminates the bow out of the glass runners or jets issuing from the spout neck orifice openings thus improving the alignment and uniformity of the glass jets and reducing the likelihood of producing bent gobs; and
3. reduces heat losses from the spout neck area by creating more space for insulation materials and by sharply reducing the bottom surface area of the orifice assembly from which heat is lost predominantly by radiation.

What is claimed is:

1. A glass feeder for defining a plurality of runners of molten glass comprising a spout bowl including a neck portion at the bottom thereof, said neck portion having a vertical discharge passage extending therethrough from an upper inlet opening to a lower outlet opening, said upper inlet opening being circular, said lower outlet opening being oblong defined by major and minor dimensions and said vertical discharge passage vertically transitioning from said circular upper inlet opening to said oblong lower outlet opening proceeding from said upper inlet opening to said lower outlet opening, said circular upper inlet opening having a size, relative to said oblong lower outlet opening, so that the oblong lower outlet opening is located completely within said circular upper inlet opening, and an orifice ring for receiving molten glass from said oblong lower outlet opening, said orifice ring including a plurality of discharge holes through which said plurality of runners of molten glass can flow.

2. A glass feeder according to claim 1, wherein there is a slight taper inwardly from said upper inlet opening to said lower outlet opening of said vertical discharge passage at the location of the major dimension of said oblong lower outlet opening.

* * * * *